United States Patent
Castro León et al.

(10) Patent No.: US 11,456,923 B1
(45) Date of Patent: Sep. 27, 2022

(54) SYSTEM AND METHOD FOR FACILITATING A DYNAMIC POLICY ENGINE WITH RECURSIVE KEY SELECTION

(71) Applicant: Hewlett Packard Enterprise Development LP, Houston, TX (US)

(72) Inventors: Dannier A. Castro León, Santa Barbara (CR); Carolina Vargas Basilio, San Jose (CR); Claudio Enrique Víquez Calderón, San Jose (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/387,435

(22) Filed: Jul. 28, 2021

(51) Int. Cl.
| | |
|---|---|
| G06F 7/00 | (2006.01) |
| G06F 9/50 | (2006.01) |
| G06F 15/00 | (2006.01) |
| G06F 16/16 | (2019.01) |
| H04L 41/0893 | (2022.01) |
| H04L 43/0876 | (2022.01) |
| H04L 47/762 | (2022.01) |

(52) U.S. Cl.
CPC ...... *H04L 41/0893* (2013.01); *H04L 43/0876* (2013.01); *H04L 47/762* (2013.01)

(58) Field of Classification Search
CPC .................. H04L 41/0893; H04L 43/0876; H04L 47/762
See application file for complete search history.

(56) References Cited

U.S. PATENT DOCUMENTS

| | | | | |
|---|---|---|---|---|
| 2002/0156879 | A1* | 10/2002 | Delany | H04L 63/102 709/229 |
| 2007/0174429 | A1* | 7/2007 | Mazzaferri | H04L 63/102 709/218 |
| 2014/0032831 | A1* | 1/2014 | Asamoto | G06F 16/90339 711/108 |
| 2014/0380412 | A1* | 12/2014 | Fitzgerald | G06F 21/577 718/1 |
| 2016/0043968 | A1* | 2/2016 | Jacob | H04L 47/808 709/226 |
| 2018/0063194 | A1* | 3/2018 | Vaidya | H04L 63/0263 |

\* cited by examiner

*Primary Examiner* — Christopher B Robinson
(74) *Attorney, Agent, or Firm* — Park, Vaughan, Fleming & Dowler LLP (57) ABSTRACT

One embodiment provides a system and method for facilitating a dynamic policy engine with recursive key selection. During operation, the system can receive, at a network device, a user request to create a policy table, the user request including multiple groups of policy fields and specifying an amount of hardware resource for the policy table. The system can in response to determining that an amount of unallocated hardware resource is less than the amount of hardware resource specified in the user request, free a portion of allocated hardware resources and allocate the specified amount of hardware resource for the policy table. The system can identify, based on the user request, an optimized matching policy template that accommodates the multiple groups of policy fields. The system can then configure, based on the optimized matching policy template, one or more hardware template registers; and create the policy table.

18 Claims, 7 Drawing Sheets

| | container $_A$ | container $_B$ | container $_C$ | |
|---|---|---|---|---|
| | field $_1$ | [available] | [available] | } 416 |
| | field $_1$ | [available] | field $_2$ | } 418 |
| | Lock | [available] | field $_2$ | } 420 |
| | [available] | field $_1$ | field $_2$ | } 422 |
| | field $_3$ | field $_1$ | field $_2$ | } 424 |
| | field $_2$ | field $_3$ | field $_1$ | } 426 |
| | field $_2$ | Lock | field $_1$ | } 428 |
| | field $_2$ | [available] | field $_1$ field $_3$ | } 430 |
| | field $_2$ | field $_4$ | field $_1$ field $_3$ | } 432 |
| | FINDER STAGE 402 | REPLACER STAGE 404 | FINDER STAGE 406 | SHUFFLER STAGE 408 | REPLACER STAGE 410 | FINDER STAGE 412 |

TEMPLATE 434

SEQUENCE OF OPERATIONS 414 →

SYSTEM AND METHOD FOR FACILITATING A DYNAMIC POLICY ENGINE WITH RECURSIVE KEY SELECTION

BACKGROUND

This disclosure is generally related to the field of networking policies. More specifically, this disclosure is related to a system and method for facilitating a dynamic policy engine with recursive key selection.

BRIEF DESCRIPTION OF THE FIGURES

In the figures, like reference numerals refer to the same figure elements.

DETAILED DESCRIPTION

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

Network devices in a computer network can implement a set of networking policies that can be associated with multiple applications, e.g., access control list (ACLs) can allow a user to specify rules to deny a specific type of traffic. Further, networking policies can also correspond to forwarding rules, e.g., Policy Based Forwarding (PBF), and can be used for identifying Quality of Service (QoS). Networking policies can be implemented as a {Match Criteria, Action} operation. The match criteria can include different packet fields and internal flags, e.g., Media Access Control (MAC) addresses, internet protocol (IP) addresses, ingress port, virtual LAN (VLAN) number, etc.

Current systems assign a fixed amount of resource, e.g., fixed amount of memory, for each policy lookup that can be associated with a use case. Often some user (s) may desire additional resources to be allocated for ACL-type policies whereas other users may prefer additional resources to be allocated to PBF type policies. In general predicting or accommodating different use cases in a way that the hardware resources are optimally allocated can be a challenging or practically difficult task. This is because the existing systems may not be able to predict what type of prioritization of resources the user may prefer to apply for different use cases. In other words, the existing systems may have problems with determining a best fit resource solution for the different use cases.

For example, the network device may support seven policy tables, but the number of use cases can be addressed with just three policy lookups, in such a case the existing systems are not able re-distribute or free the resources allocated to the remaining four unused policy lookups. Further, each policy lookup includes a fixed number of entries, i.e., a fixed number of resources are assigned to each policy lookup, which also limits the flexibility of re-distributing resources when they are unused. To re-distribute the resources, some existing systems require a reboot of the switch to start the switch in a different configuration. In other words, restarting the switch each time a different configuration or re-distribution of resources is required can result in the disruption of network services and a degradation in system performance.

Furthermore, the network packets can include variable fields or programmable components, i.e., fields that can be of different sizes or associated with different applications which may correspond to non-standard packet fields. During the process of creating a policy lookup, identifying a policy template that matches these variable fields can be challenging because there can be a large set of combinations, e.g., around five million possibilities, to choose from. Therefore, finding an optimized policy template that consumes the least amount of resource from among the large set of possibilities can add significant delay in creating a policy lookup and can hence significantly degrade the performance of the system.

Embodiments described herein provide a technical solution to the above-mentioned technical problems by providing a system and method for facilitating a dynamic policy engine that can dynamically re-distribute resources to the policy lookups, without interrupting network traffic, i.e., without rebooting the switch or the network device. Specifically, based on the policy fields specified in the user request to create a new policy lookup and the specified amount of hardware resources, the dynamic policy engine can identify from among the plurality of templates supported in the hardware, a best template, e.g., a smallest template, that can accommodate the user-specified policy fields and can provide for an optimum resource utilization. In other words, the dynamic policy engine can select, based on the user-specified match criteria provided for creating a policy lookup, a suitable matching policy template and a corresponding hardware configuration. In addition, when the unallocated hardware resources in the network device is less than the specified amount of hardware resource, the dynamic policy engine can free a portion of allocated hardware resource, thereby facilitating the re-distribution of resources and allocation of the specified amount of hardware resource to the created policy table.

Furthermore, when the user request includes variable policy fields, the dynamic policy engine can apply a novel recursive match template (or key) selection algorithm to efficiently select a best template from among the large number of available possibilities. Specifically, the recursive algorithm can assign individual policy fields based on specific occupancy rules into different templates with some pre-specified constraints and can identify a matching policy template that can host the fields. In other words, the recursive algorithm can identify the matching policy template by complying with the occupancy rules and the hardware restrictions in a tractable execution time.

The term "policy table" refers to a data table in memory, e.g., in ternary content addressable memory (TCAM), including a number of policy entries and each policy lookup is associated with a different template. The terms "policy lookup" and "policy table" have been used interchangeably in this disclosure.

The term "policy template" refers to a hardware supported template that includes a specific layout or combination of packet fields.

System Architecture and Dynamic Policy Engine

Figure 1:
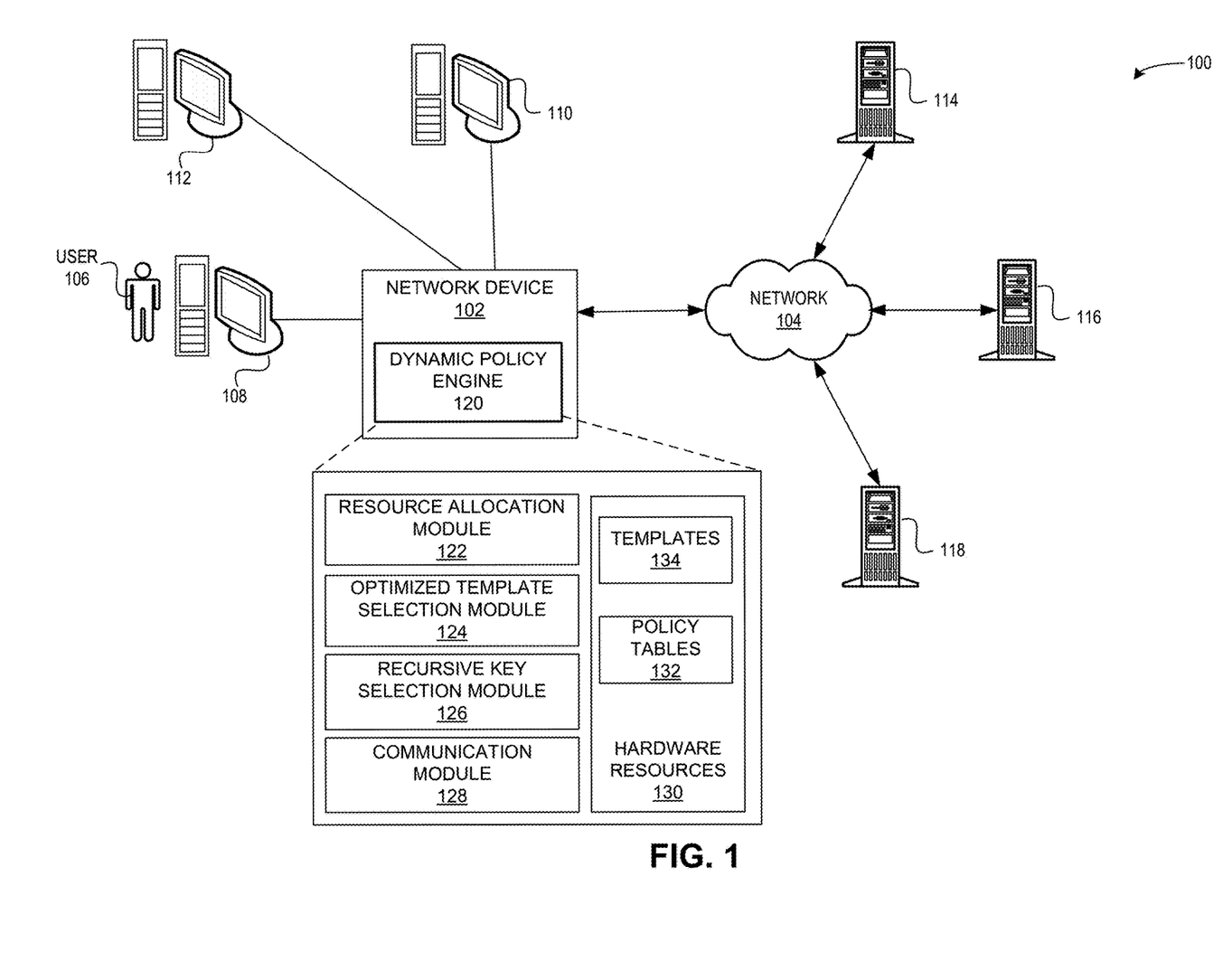
FIG. 1 illustrates an exemplary environment and system architecture that facilitates a dynamic policy engine with recursive key selection algorithm, according to one embodiment.

FIG. 1 illustrates an exemplary environment and system architecture that facilitates a dynamic policy engine with recursive key selection algorithm, according to one embodiment. In the example shown in FIG. 1, environment 100 allows devices coupled via network 104, e.g., personal computers 108-112, servers 114-118, and data storage devices to exchange data. The datapath between these devices can often include a number of intermediary datapath devices, e.g., network switches, gateways, and routers for routing data between the devices along a selected datapath. For example, network device 102 is an intermediary datapath device that can implement networking policies. These networking policies can include a set of forwarding rules that can be applied to a packet when some match criteria are satisfied.

Network device 102 can include an Application Specific Integrated Circuit (ASIC) or a circuitry for implementing a dynamic policy engine 120. The ASIC can support multiple policy lookups with each policy lookup associated with some match criteria and an application. Dynamic policy engine 120 can include a resource allocation module 122 for dynamically allocating resources to different policy lookups; an optimized template selection module 124 for selecting a best matching policy template from among a plurality policy templates supported in hardware; a recursive key selection module 126 for selecting a matching policy template when the user request includes programmable fields; a communication module 128 for receiving user requests and network packets; and hardware resources 130. The different operations associated with dynamic policy engine 120 is described below in reference to FIGS. 3-6.

Hardware resources 130 can include memory for storing policy tables 132, e.g., in TCAM tables, for storing policy templates 134, i.e., the policy tables can be implemented as TCAM tables. Hardware resources 130 can also include a counter associated with each policy entry a policy table. For example, for a specific policy entry, dynamic policy engine 120 can apply a counter to count a number of packets that match a policy entry in a policy table.

Dynamic policy engine 120 can dynamically assign resources to different policy lookups without interrupting network traffic flowing through network device 102, i.e., dynamic policy engine 120 can dynamically assign policy tables in TCAM. For example, hardware resources 130 can support a pool of TCAM resources and dynamic policy engine 120 can enable the combining of two TCAM's into one TCAM.

In another example, when the circuitry implementing dynamic policy engine 120 supports seven policy lookups, dynamic policy engine 120 can initially assign "X" amount of resource to first three policy lookups associated with an ACL type use case. Later, during runtime when the user decides to use a PBF type application, dynamic policy engine 120 can dynamically re-assign or redistribute TCAM and counter resources, i.e., hardware resources 130, to the remaining four policy lookups from among the seven policy lookups.

In one embodiment, dynamic policy engine 120 can efficiently re-configure the hardware and assign match keys (or templates) that are used in each policy lookup. The circuitry implementing dynamic policy engine 120 can support a set of pre-defined match keys or match templates with different sizes. Dynamic policy engine 120 can apply these match templates to create different policy entries in each of the policy lookups. An example of the match templates and the policy lookups is described below in reference to FIGS. 2A and 2B.

Figure 2A:
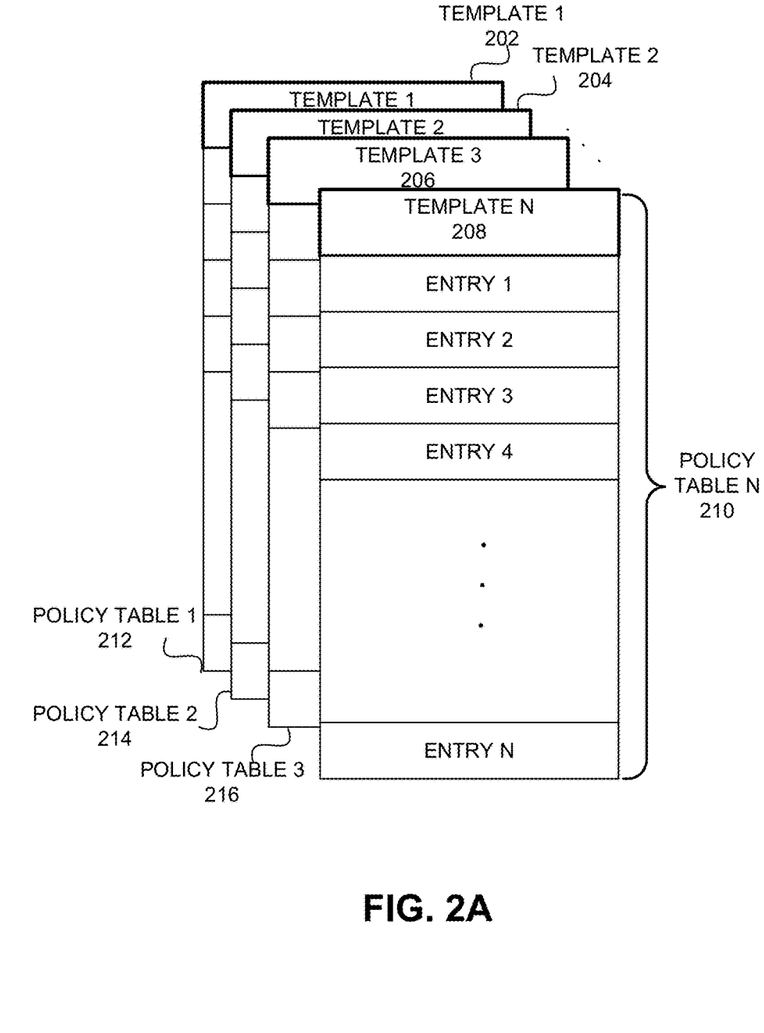
FIG. 2A illustrates an example of policy templates and policy tables, according to one embodiment.

FIG. 2A illustrates an example of policy templates and policy tables, according to one embodiment. In this example, a set of policy tables 212-216 are shown. Each policy table is associated with a policy template, i.e., policy table 212 is associated with policy template 202, policy table 214 with policy template 204, etc. A policy template represents a pre-defined combination of fields supported by the hardware. Each policy table can include a set of policy entries, i.e., entry 1-N. The circuitry implementing the dynamic policy engine can support a pre-defined number of policy templates.

Whenever the dynamic policy engine receives a user request to create a policy table, the dynamic policy engine can create a policy table based on the match fields specified in the user request. In other words, based on the match fields specified in the user request, the dynamic policy engine can identify a best or a smallest policy template from among the pre-defined set of policy templates that accommodates the match fields. Therefore, the dynamic policy engine can create new policy tables and each policy table can have a different number of policy entries. In other words, the dynamic policy engine can assign different amount resources to different policy tables. For example, the dynamic policy engine can assign 1K number of entries for one policy table and 2K number of entries for another policy table.

Figure 2B:
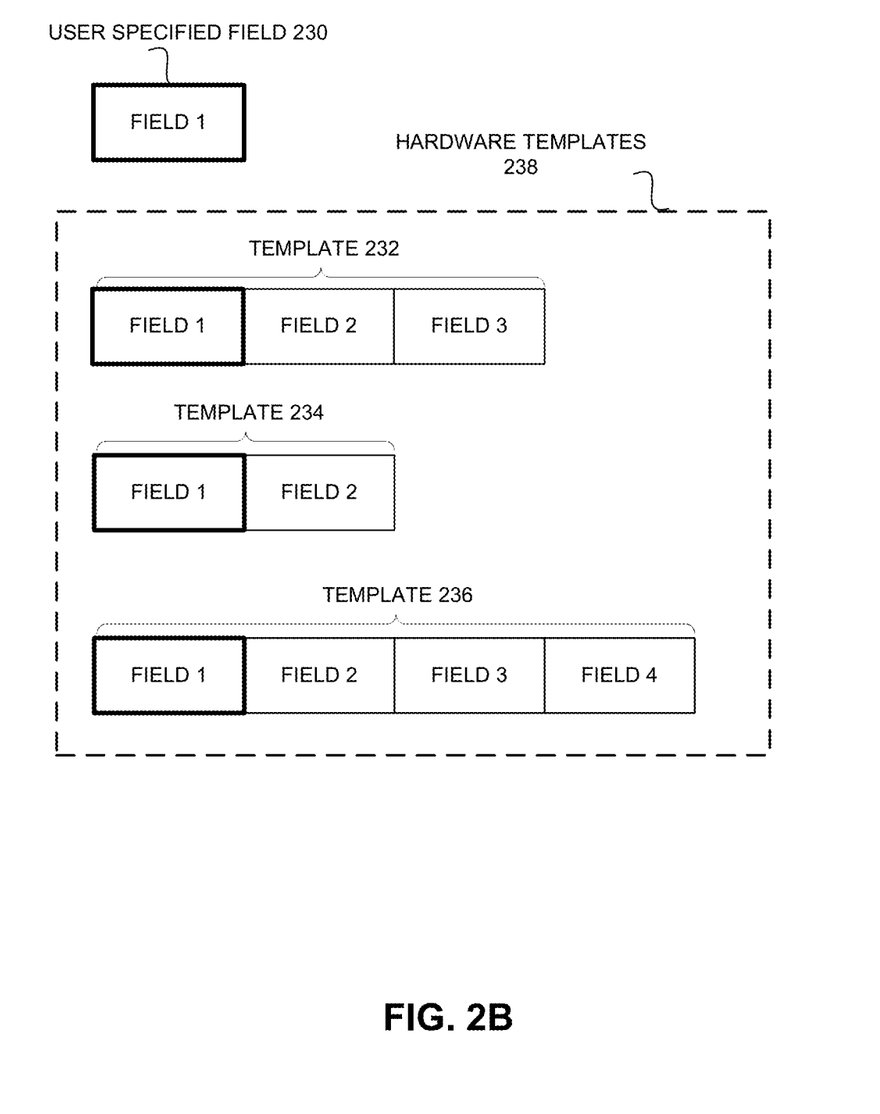
FIG. 2B illustrates an example of selecting a policy template from different policy templates including different combination of fields, according to one embodiment.

FIG. 2B illustrates an example of selecting a policy template from different policy templates including different combination of fields, according to one embodiment. FIG. 2B provides a simple example to illustrate how a best policy template can be selected from the set of hardware supported templates 238. For example, when a user desires to create a policy table, the user may specify in the user request one or more policy fields, an amount of resource to be allocated to the policy table, e.g., 10K number of policy entries, and a size component indicating a size of the lookup key. In this example, for the sake of simplicity the user may specify one field 230, i.e., field 1, in the user request. The dynamic policy engine can match user specified filed 230 with the hardware supported templates 238. A policy template can represent a specific layout or combination of fields supported in the hardware.

The dynamic policy engine may select a policy template that accommodates user specified field 230 and that which has the smallest size. In this example, although all the three templates, i.e., 232-236, accommodate field 230, the dynamic policy engine selects template 234 which is the smallest in size. This is because the smallest template, i.e., template 234, consumes less resources compared to the other templates, i.e., templates 232 and 236. Furthermore, the created policy table associated with the smallest template can accommodate more policy entries when compared to a policy table with a larger template size. In a working system, the hardware can support a large number of policy templates and searching for a best policy template that matches the user specification can be a complex operation which is efficiently performed by the dynamic policy engine. The operation of the dynamic policy engine is described below in reference to FIGS. 3-6.

Figure 3:
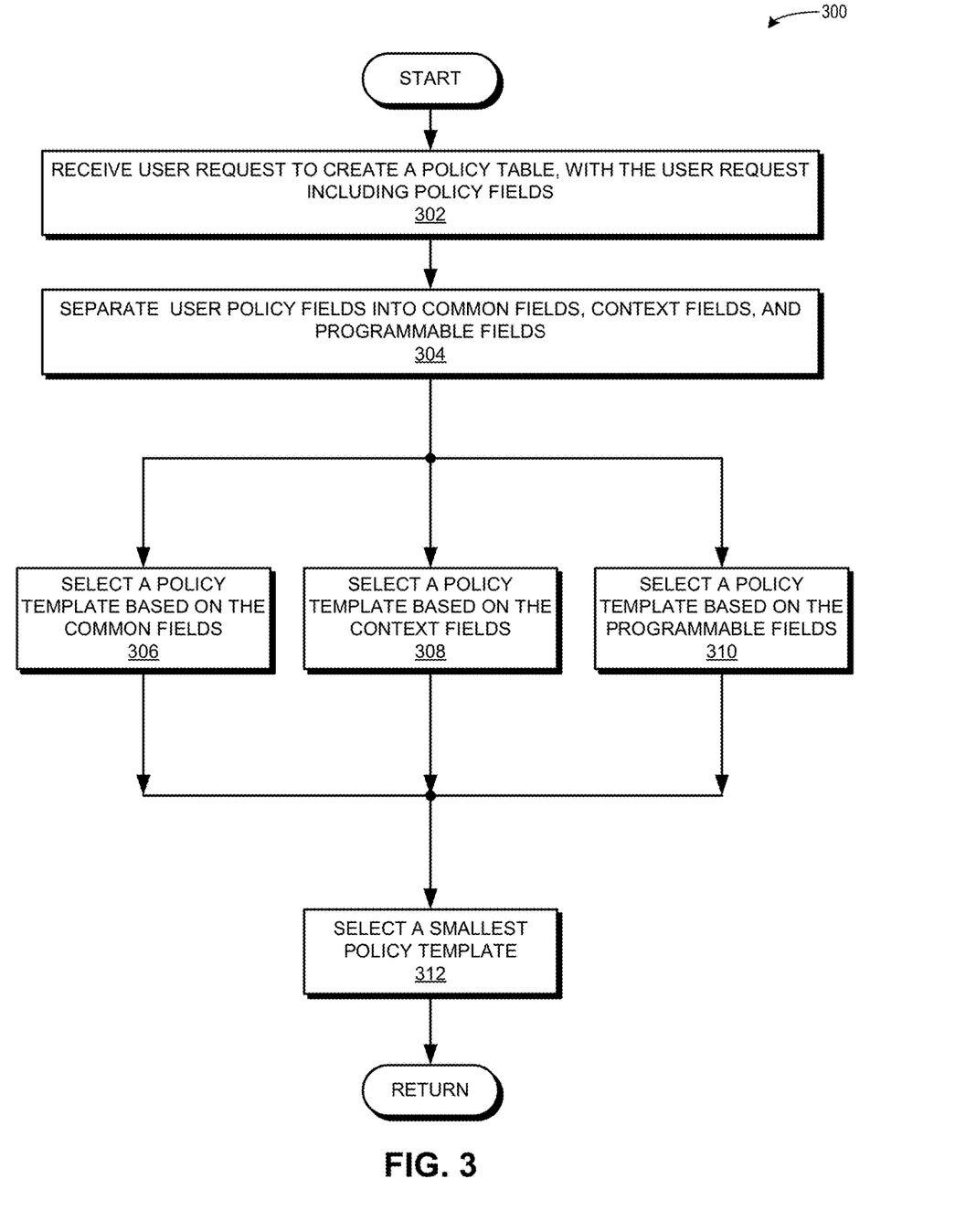
FIG. 3 presents a flowchart illustrating an exemplary process for selecting a smallest policy template, according to one embodiment.

FIG. 3 presents a flowchart illustrating an exemplary process for selecting a smallest policy template, according to one embodiment. Referring to flowchart 300 in FIG. 3, during operation, the system (i.e., the dynamic policy engine) receives a user request to create a policy table and the user request can include a set of policy fields that has to be matched against the policy templates supported in hardware to find a best matching policy template (operation 302). The user request can specify a size component which indicates the size of the lookup key, i.e., the size of the policy template. When the size of the policy template is large, the policy template can accommodate a large number of packet fields but can result in consuming more hardware TCAM resources.

In response to receiving the user request, the system can perform the grouping of the received policy fields into three categories which can include a common component category, a context component category, and a programmable component category (operation 304). The common component category can correspond to a set of common fields that is based on the traffic type. For example, some of the common fields can include MAC source address (SA), MAC destination address (DA), IP SA, IP DA, etc. The context component category can include a set of context fields corresponding to interface identifiers, which can be part of the policy key or template. For example, some of the interface identifiers that can be included in the context component category are source VLAN number, destination physical port, etc.

The programmable component category corresponds to variable components, i.e., variable fields that could have different sizes or can be associated with different applications. Some of the associated applications can be customized applications with non-regular or non-standard packet fields. Unlike the common and the context component categories, the programmable component category can be complex and challenging. This is because the programmable component category can provide a flexible structure which results in a large set of combinations, e.g., around five million or more possibilities, and the system has to find a suitable match template configuration that accommodates the user request in a tractable time. The process of finding the best template when the user request includes programmable components is described below in reference to FIGS. 4 and 5.

In response to classifying the set of policy fields into the three categories, the system can select one or more policy templates based on the common fields (operation 306), context fields (operation 308), and based on the programmable or variable fields (operation 310). The system can then select a smallest policy template (operation 312) from among the policy templates identified in operations 306-310, and operation 312 then returns.

In one embodiment, the user request can include an amount of hardware resources to be allocated to the policy table. For example, the user may desire to allocate 10K entries for the policy table. Based on the amount of resource specified in the user request, the system may determine whether sufficient amount of unallocated hardware resource is available to accommodate the user-specified resource requirement. When sufficient amount of unallocated resource is available, the system may assign the user-specified amount of resource for accommodating a policy table.

However, when the system determines that the amount of unallocated hardware resources is less than the user-specified resource amount, the system may redistribute or free a portion of the allocated hardware resources to the new policy table. For example, the system may support five policy tables and the system may be using only three policy tables corresponding to three different applications. In such a case, the system may re-assign or free the resources of the unused policy tables so that they can be used to create the new policy table and/or can be added to a pool of available or unallocated resources.

In another embodiment, the system may receive a request to add policy entries to an already existing policy table. The user may also specify in the user request a type of policy lookup, e.g., an ACL type policy lookup, PBF type policy lookup, etc. When the system determines that the amount of unallocated hardware resources is less than the user-specified resource amount for the policy entries, the system may redistribute or free a portion of the allocated hardware resources, e.g., these allocated hardware resources can correspond to unused policy tables, to the policy table to which the user desires to add policy entries. In other words, the system can allow the user to add policy entries in an already existing policy table or delete policy entries. The system can then dynamically assign resources to the policy table and configure the ASIC without interfering with the network traffic and without disrupting network services.

Dynamic Policy Engine with Recursive Key Selection Algorithm

As already explained in reference to FIG. 3, that programmable components provide a flexible structure that can generate a large set of field combinations, e.g., in the order of millions of possibilities. From this large set of combinations, the system must find a suitable matching policy template configuration that accommodates the policy fields specified in the user request in a short time without compromising with the flexibility the variable fields provide. One embodiment provides an efficient combination-finder algorithm or a recursive key selection algorithm for the programmable fields. The recursive key selection algorithm can provide a tractable execution time, meaning that the algorithm can reduce the time to create new policy lookups or policy tables by several orders of magnitude. Further the recursive key selection algorithm can scale well for future ASIC generations.

The recursive key selection algorithm (RKSA) can order individual elements or programmable fields that follow specific occupancy rules into different templates with one or more constraints. The RKSA can then find a suitable template that can host the programmable fields after complying with the occupancy rules and hardware restrictions in a tractable execution time.

Each field in the set of programmable fields can be associated with one or more occupancy rules. The occupancy rules indicate which position (s) or place (s) in the packet can accommodate the different programmable fields specified in the user request. There can be a limited number of these places or positions and can be defined as containers, since they are able to host one or more fields depending on one or more constraints. Let $S(field_1, field_2, \ldots)$ represent a function that can return a set of containers in which the field (s) provided in the function can fit simultaneously. Table 1 below shows an example of a first mapping between containers and fields.

TABLE 1

First mapping indicating a mapping between containers and fields

| Function | List of Containers |
| --- | --- |
| $S(field_1)$ | {$container_A$, $container_B$, $container_C$, $container_D$} |
| $S(field_2)$ | {$container_A$, $container_B$, $container_D$} |
| $S(field_3)$ | {$container_A$, $container_B$, $container_D$} |
| $S(field_4)$ | {$container_E$, $container_F$} |
| $S(field_2, field_3)$ | {$container_D$} |

In the hardware these containers can be organized into pre-defined sets called templates. Each template can provide a specific set of containers. Table 2 shows an example of a second mapping between containers and the hardware templates.

TABLE 2

Second mapping indicating a mapping between containers and templates

| Templates | List of Containers |
| --- | --- |
| $template_1$ | {$container_A$, $container_B$, $container_D$} |
| $template_2$ | {$container_B$, $container_F$, $container_G$} |
| $template_3$ | {$container_A$, $container_B$, $container_C$, $container_E$} |
| $template_4$ | {$container_D$, $container_H$} |

The RKSA may find a template that can accommodate the variable or programmable fields specified in the user request, i.e., the RKSA may select one possible container for each field. In the other words, based on the examples provided in Table 1 and Table 2 which include just four fields and four templates, the RKSA can determine the following assignments: $field_1 \rightarrow container_C$; $field_2 \rightarrow container_A$; $field_3 \rightarrow container_B$; $field_4 \rightarrow container_E$. Based on these assignments, the RKSA can select $template_3$ to host the fields specified in the user request. In a working system, the number of fields, containers, and templates can be large, i.e., they can correspond to millions of possible combinations and applying the limited processing resources to efficiently select the best template can be a complex and challenging task. The RKSA is an efficient combination-finder algorithm that can select a best template from among the large set of field combinations, i.e., in the order of millions.

Specifically, the RKSA can include three stages: a finder stage, a replacer stage, and a shuffler stage. In one embodiment, the RKSA can implement these three stages in three logic units, e.g., a finder logic unit, a replacer logic unit, and a shuffler logic unit. The RKSA calls these three stages consecutively depending on the difficulty level in finding an available container for each user-specified programmable field. In other words, the RKSA may accommodate the programmable fields before all the three stages have been implemented or called. Further, in some cases, RKSA may not accommodate the programmable fields even after the operations in the third stage has been completed, thereby indicating that the current template under consideration may not be able to host all the user-specified programmable fields and the dynamic policy engine may have to consider another template to apply the RKSA. The operations performed in the three stages are explained below with reference to an example.

Assume that the user has specified four programmable fields in the user request: $field_1$, $field_2$, $field_3$, and $field_4$. Table 3 provides a list of a set of containers for each field (a first mapping between the container and the user-specified fields), i.e., the function $S(field_1, field_2, \ldots) \neq \emptyset$ (in hardware this list of containers is provided based on the design specification).

TABLE 3

List of containers for a list of fields (first mapping)

| Function | List of Containers |
| --- | --- |
| $S(field_1)$ | {$container_A$, $container_B$, $container_D$} |
| $S(field_2)$ | {$container_A$, $container_D$} |
| $S(field_3)$ | {$container_A$, $container_D$} |
| $S(field_4)$ | {$container_B$, $container_C$} |
| $S(field_1, field_3)$ | {$container_D$} |

Table 4 provides a list of available templates, i.e., a second mapping between the containers and the hardware supported templates. During operation of the system, this list of available templates has to be provided before the RKSA starts (this list of available templates is also provided based on the hardware design specification). For the sake of simplicity, the example includes just two templates, while the actual hardware can include a large number of templates with different combination of containers, e.g., in the order of millions of combinations.

TABLE 4

Templates and associated list of containers (second mapping)

| Templates | List of Containers |
| --- | --- |
| $template_0$ | {$container_C$, $container_E$, $container_F$} |
| $template_1$ | {$container_A$, $container_B$, $container_D$} |

Figure 4:
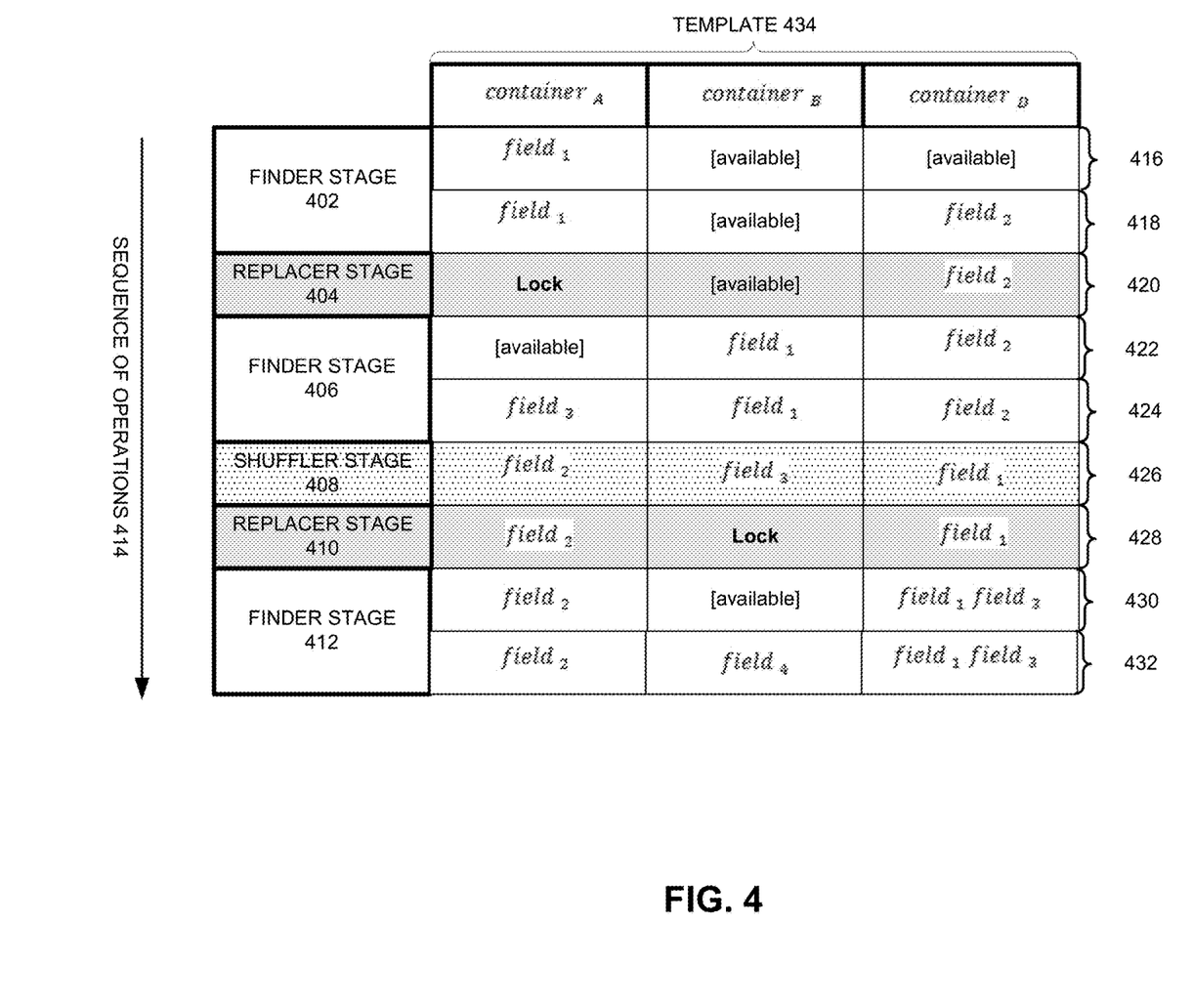
FIG. 4 illustrates different stages of a recursive key selection algorithm with corresponding assignments of different user-specified policy fields to containers within a policy template, according to one embodiment.

FIG. 4 illustrates different stages of a recursive key selection algorithm with corresponding assignments of different user-specified policy fields to containers within a policy template, according to one embodiment. In the example shown in FIG. 4, in response to receiving user-specified programmable fields, the RKSA may start with a finder stage in which the RKSA may consider a first template, e.g., $template_0$, and find an available container for each field ($template_0$ not shown in FIG. 4). The first template, i.e., $template_0$, includes three places or positions. The RKSA finds an available container consecutively in the first, second, and third places for $field_1$. From Table 3 and Table 4 it is observed that there is no container in $template_0$ that can accommodate $field_1$, i.e., $template_0 \cap S(field_1) = \emptyset$. In such a case, RKSA may discard $template_0$ in finder stage and proceed with the next template, i.e., $template_1$ in the above example. For the example shown in FIG. 4, the RKSA can perform the operations associated with the three stages in a sequence indicated by arrow 414. The order or sequence in which the three stages are implemented can be based on policy templates under consideration and the user-specified fields.

For $template_1$ 434, the RKSA in finder stage 402 may find an available container starting from the first position or space to the last position in $template_1$ 434. In other words, when the RKSA finds a container in the first position for field$_1$, i.e., in this example container$_A$ occupies the first position in template$_1$ 434, the RKSA can assign field$_1$ to container$_A$ (assignment 416). The RKSA can continue in finder stage 402 to find another available container for a next field, field$_2$. This field can be accommodated inside container$_A$ or container$_D$ (based on the examples in Table 3 and Table 4). The RKSA may identify that container$_A$ was already occupied in the first implementation of finder stage 402, and hence may assign field$_2$ to the next available container, i.e., container$_D$. The assignments of field$_1$ to container$_A$ and field$_2$ to container$_D$ is shown in 418.

The RKSA may continue to find an available container for a next field, i.e., field$_3$. Based on Table 3 and Table 4, field$_3$ can be accommodated inside container$_A$ or container$_D$, but both these containers are already occupied with fields field$_1$ and field$_2$ (see assignments in 418). In such a case, the RKSA may proceed to the next stage, i.e., replacer stage 404, and may facilitate the re-assigning or moving of one or more previously assigned fields to another available container and freeing a previously occupied container for field$_3$.

Specifically, in replacer stage 404, the RKSA can identify that the incoming field, e.g., field$_3$, can be accommodated inside at least one container in the given template, e.g., template$_1$, but no containers are currently available for field$_3$. In such a case, replacer stage 404 can determine that an already assigned field$_1$ can also be accommodated in container$_B$ (based on Tables 3 and 4). The RKSA may then call finder stage 406 again to perform the field assignments. However, every time the RSKA calls or implements the finder stage a new constraint is included, this new constraint can correspond to locking of one or more containers for assigning a current policy field.

For the example shown in FIG. 4, the RKSA may apply replacer stage 404 to start with the first position in template$_1$, i.e., container$_A$, which has been previously assigned to field$_1$ (see 418 in finder stage assignments 402). Replacer stage 404 may find another available container for field$_1$ so that container$_A$ is available for the next incoming field field$_3$. To perform the find operation, replacer stage 404 may trigger the re-running of the RKSA from the first stage, i.e., finder stage 406, but with a lock constraint or not using container$_A$. Accordingly, based on the function S(field$_1$) (see Table 3), field$_1$ can be accommodated inside container$_B$ (see 420 in replacer sage 404). Now container$_A$ is available again, and RKSA can apply finder stage 406 to generate assignments 422 and 424.

When the function S( ) returns a list of containers in which two or more fields are associated with one container, this can indicate that the finder stage can accommodate the two or more fields simultaneously inside one container. Such containers are known as shareable containers. In this example, container$_D$ is shareable for field$_1$ and field$_3$. Therefore, when the RKSA calls finder stage 406 after replacer stage 404, RKSA may apply replacer stage 404 to lock at least one container (see assignments 420 in replacer stage 404), e.g., container$_A$ or container$_D$, that can accommodate field$_3$. In other words, in replacer stage 404, RKSA can lock and free the locked container, i.e., the locked container container$_A$, for the current incoming field. Since replacer stage 404 has locked container$_A$, the previously assigned field$_1$ is sent again to finder stage 406 for assigning to any available container, e.g., container$_B$, other than the locked container. The locked container$_A$ is then available for field$_3$. Further, the RKSA can perform such a lock operation to prevent the finder stage from assigning any other incoming fields, i.e., other than field$_3$, to the locked container(s).

RKSA may then identify that for the new field, i.e., field$_4$, there are no available containers and that no containers can be made available in finder or replacer stages. This is because all the available containers, e.g., container$_A$, container$_B$, and container$_D$ in template$_1$, have been occupied by the previous three fields (see assignments 424). In such a case, RKSA may proceed to shuffler stage 408 which can represent the last stage in the RKSA. Shuffler stage 408 may provide a solution by identifying at least two already assigned fields that can interchange their containers. In other words, shuffler stage 408 may find a combination of fields that can be shared by a container. Specifically, shuffler stage 408 may move either an already assigned field from a previous container to a shareable container, thereby leaving the previous container free to accommodate the new field or the new field may be accommodated in the shareable container.

Therefore, whenever shuffler stage 408 finds two fields that can be interchanged, the two fields are moved or shuffled and the RKSA is re-started from the finder stage for the new field, field$_4$. Since all the containers are still occupied, the RKSA identifies that the finder stage is unable to find an available container for the new field, field$_4$. The RKSA may then proceed to replacer stage 410 in which it identifies that field$_1$ and field$_3$ can share container$_D$. Therefore, replacer stage 410 may lock container$_B$ (see assignments 428) so that it is available for the new field, field$_4$ and may facilitate the field$_1$ and field$_3$ to be accommodated in the shareable container$_D$. Now container$_B$ is available again and the RKSA may assign field$_4$ to container$_B$ in finder stage 412 (see assignments 430 and 432). Therefore, the RKSA identifies template$_1$ as the best template that can accommodate the user-specified fields. Further, in the example shown in FIG. 4, the RKSA is recursive, meaning that the same process, e.g., finder stage, replacer stage, and/or the shuffler stage, is executed multiple times with new constraints applied in each iteration.

The RKSA is independent of the hardware implementation, which means that the RKSA may only need to know the association of the fields to containers and the templates supported in hardware, i.e., the first mapping and the second mapping. Therefore, future ASICs implementing the dynamic policy engine with RKSA may add or remove new fields or templates dynamically without interrupting the network services.

Figure 5:
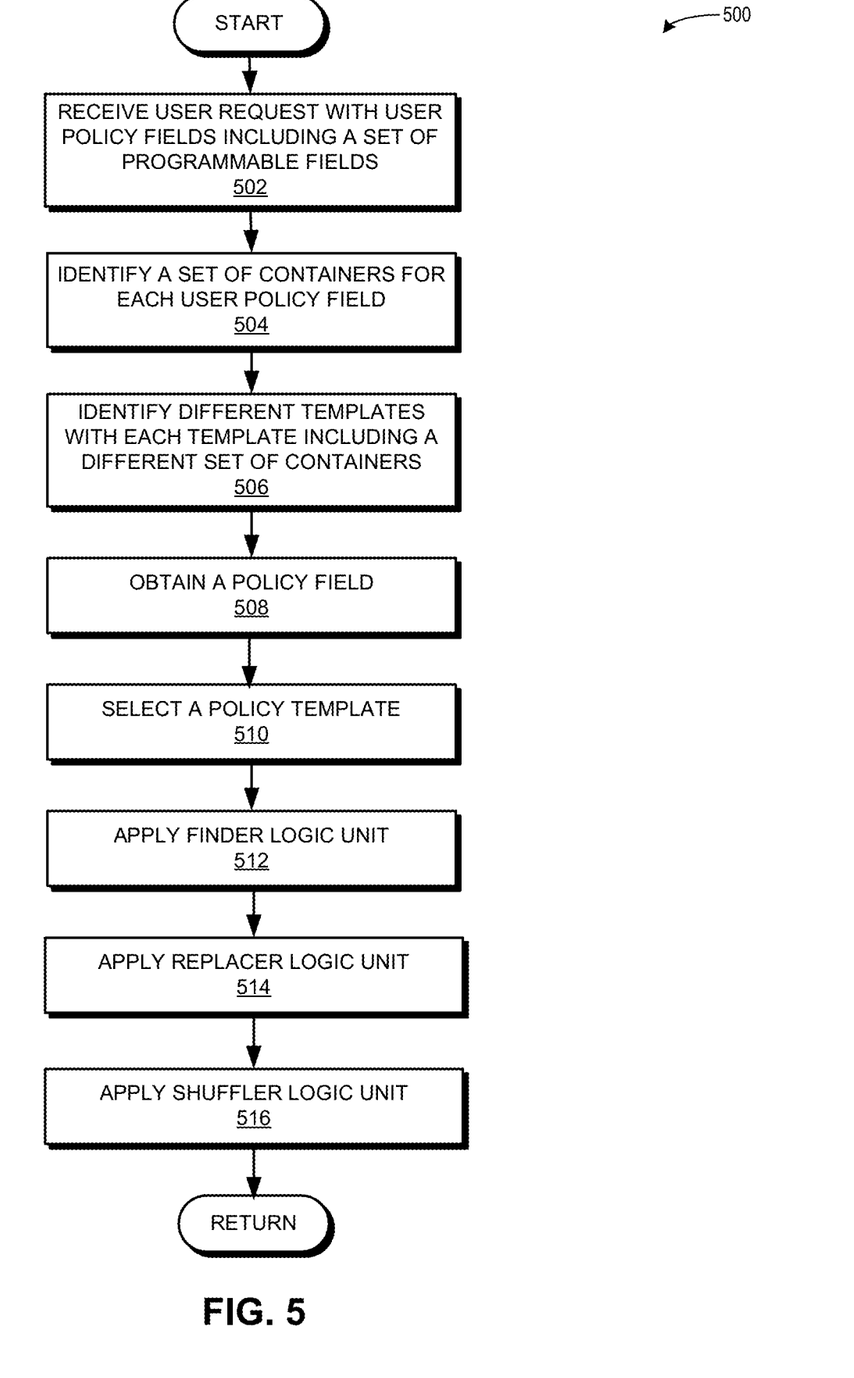
FIG. 5 presents a flowchart illustrating a process for selecting a policy template based on a dynamic policy engine with recursive key selection, according to one embodiment.

FIG. 5 presents a flowchart illustrating a process for selecting a policy template based on a dynamic policy engine with recursive key selection, according to one embodiment. Referring to flowchart 500 in FIG. 5, during operation, the system implementing the dynamic policy engine with recursive key selection can receive a user request with policy fields including a set of programmable or variable fields (operation 502). The system may identify a set of containers for each user-specified policy field representing a first mapping (operation 504; also see example in Table 3 above). The system can identify different templates with each template including a different set of containers representing a second mapping (operation 506; see Table 4). The system can then obtain a policy field (operation 508) and select a policy template from a set of templates supported in hardware (operation 510).

In response to selecting a specific template, the system can apply a RKSA (described in FIG. 4), i.e., a finder logic unit (operation 512), a replacer logic unit (operation 514), and a shuffler logic unit (operation 516), to identify a policy template that accommodates all the policy fields specified in the user request and then the operation returns.

Specifically, the system can apply the finder logic unit (operation 512) to perform the following: to find and assign one or more policy fields to one or more available containers in the policy template under consideration; in response to determining that a container for a next policy field is already assigned to another field and the current policy template includes an available container, applying the replacer logic unit; in response to determining that the container for the next policy field in the user request is already assigned to another field and the policy template includes no available containers, applying the shuffler logic unit; in response to determining that the policy fields in the programmable component group are assigned to the set of containers in the current policy template, selecting the current policy template as the matching policy template; in response to determining that the policy fields in the programmable component group are not assigned to the set of containers in the current policy template, applying the finder logic unit to a next policy template.

The system can apply the replacer logic unit (operation 514) to perform the following: in response to determining that a first container is already assigned to a first field in the policy template and there exists second container that is available for the first field: locking the first container for a next policy field; and applying the finder logic unit to move the first field to the second container and for assigning the next policy field to the first container; and in response to determining that the policy template includes no available containers but the first policy field is associated with a shareable container assigned to a second policy field, locking the first container for the next policy field; applying the finder logic unit to move the first policy field to the shareable container and for assigning the next policy field to the first container The system can apply the shuffler logic unit (operation 516) to perform the following: shuffling the fields already assigned to the containers; and applying the replacer logic unit when the policy template includes shareable containers.

Exemplary Computer System

Figure 6:
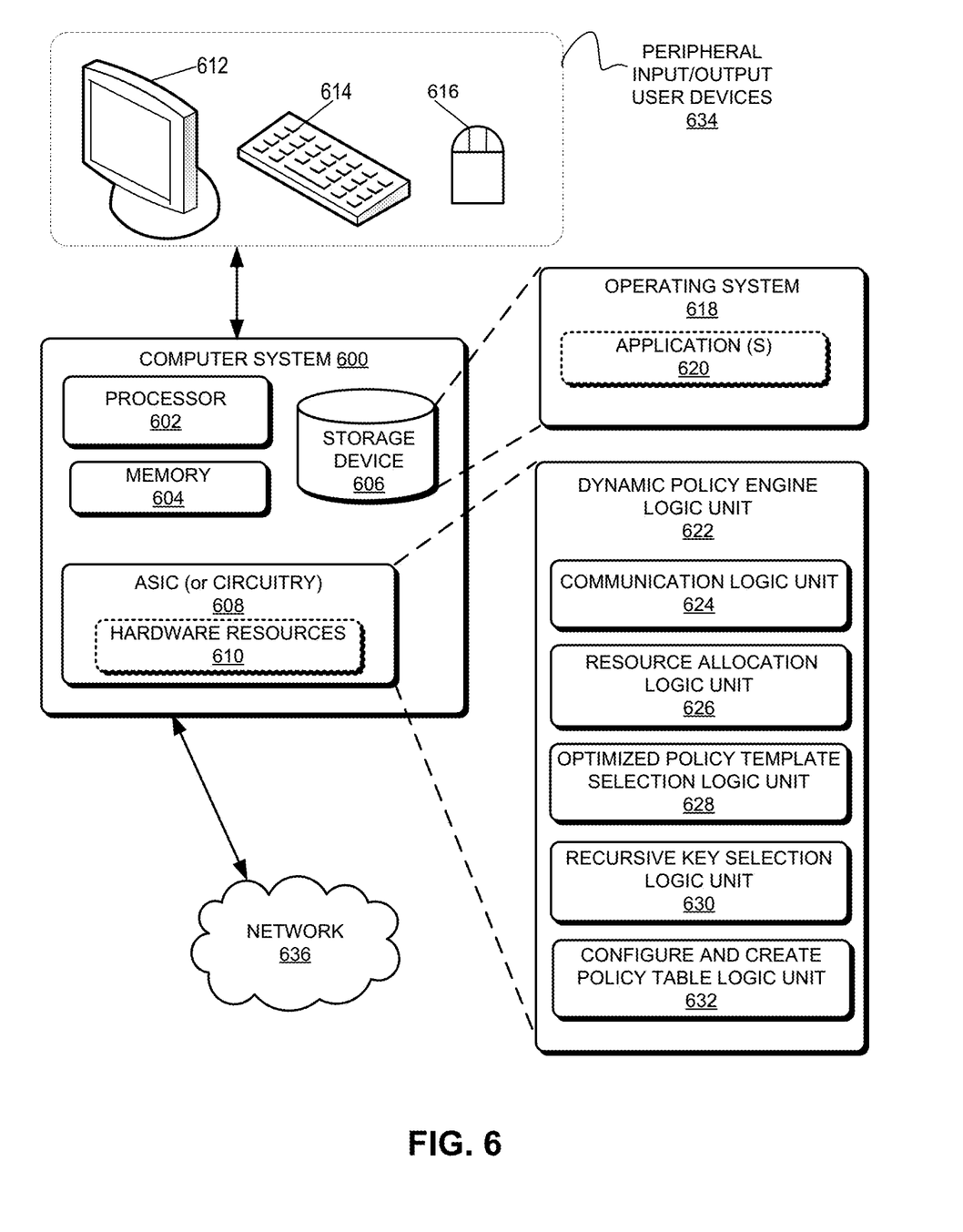
FIG. 6 illustrates an exemplary computer system equipped with a circuitry that facilitates implementing a dynamic policy engine with recursive key selection, according to one embodiment.

FIG. 6 illustrates an exemplary computer system equipped with an ASIC that facilitates implementing a dynamic policy engine with recursive key selection, according to one embodiment. In this example, computer system 600 can include a processor 602, a memory 604, a storage device 606. Computer system 600 can be coupled to peripheral input/output (I/O) user devices 634, e.g., a display device 612, a keyboard 614, and a pointing device 616. Storage device 606 can store instructions for an operating system 618. One or more applications 620 can operate on operating system 618. Computer system 600 can be coupled via one or more network interfaces to a network 636.

Computer system 600 can be equipped with an ASIC or a circuitry 608 which can include hardware resources 610. Hardware resources 610 can include counters, TCAM resources for storing networking policy related information, e.g., the policy tables, policy templates, etc. Circuitry 608 can include a dynamic policy engine logic unit 622 to perform methods and/or processes described in this disclosure. Dynamic policy engine logic unit 622 can include a communication logic unit 624, a resource allocation logic unit 626, an optimized policy template selection logic unit 628, a recursive key selection logic unit 630, and a configure and create policy table logic unit 632.

Communication logic unit 622 can send and/or receive data packets from other nodes and/or network devices in network 636. Communication logic unit 624 can further receive user request. For example, the user request can correspond to a request for creating a policy table, to add policy entries in an already existing policy table, to delete a policy table, to delete entries in a policy table, etc. The user request can include user-specified policy fields, a user-specified size component indicating a size of the lookup key. A large lookup key size indicates a large template size that can accommodate more packet fields but can also consume hardware TCAM resources. The user request can also specify an amount of hardware resources for a policy table, e.g., a size of the policy table or a number of entries to be accommodated in a policy table.

Resource allocation logic unit 626 can allocate the amount of hardware resources specified in the user request. For example, when the user request corresponds to creating a policy table, resource allocation logic unit 626 may allocate the specified amount of hardware resources for the policy table. However, if the amount of unallocated hardware resources is less than the specified amount of hardware resources, the resource allocation logic unit 626 may re-distribute and/or free a portion of the allocated hardware resources to accommodate the policy table with the specified amount of hardware resources.

In another example, the user request may include a request to add entries to the policy table and may specify a desired size of the policy table to accommodate the policy entries. In such a case, resource allocation logic unit 626 may determine whether sufficient amount of hardware resources is available to accommodate a specified size for a policy table. When the sufficient amount of resource is not available, resource allocation logic unit 626 can re-distribute or free a portion of hardware resources associated with other policy tables, e.g., policy tables which are unused, for accommodating the new policy entries in the user-specified policy table.

Dynamic policy engine logic unit 622 may apply an optimized policy template selection logic unit 628 to search for one or more policy templates corresponding to each of the user-specified field categories, e.g., the common component fields, context component fields, and programmable component fields. Optimized template selection unit 628 may then select one smallest template that accommodates the user-specified policy fields. A smallest template is selected because it consumes less amount of hardware resource for the policy table.

When the user request for creating a policy table includes programmable policy fields, dynamic policy engine logic unit 622 can apply recursive key selection logic unit 630 to implement a RKSA to identify one or more templates that can accommodate the user-specified programmable fields. Dynamic policy engine logic unit 622 can then apply optimized policy template selection unit 628 to select the smallest template that accommodates the user-specified policy fields. In response to selecting the smallest or the optimized policy template, dynamic policy engine unit 622 can apply configure logic unit 632 to configure one or more hardware registers based on the optimized policy template and create the policy table.

One embodiment described in the present disclosure can provide a system and method for facilitating a dynamic policy engine with recursive key selection. During operation, the system can receive, at a network device, a user request to create a policy table, the user request including multiple groups of policy fields and specifying an amount of hardware resource for the policy table. The system can in response to determining that an amount of unallocated hardware resource is less than the amount of hardware resource specified in the user request, freeing a portion of allocated hardware resources. The system can then allocate the specified amount of hardware resource for the policy table. The system can identify, based on the user request and a plurality of policy templates supported in hardware, an optimized matching policy template that accommodates the multiple groups of policy fields. A respective policy template is associated with a different set of policy fields. The system can then configure, based on the optimized matching policy template, one or more hardware template registers; and create, based on the configured one or more hardware template registers, the policy table.

In a variation on this embodiment, the system can identify one or more matching policy templates for a respective policy field group.

In a variation on this embodiment, the optimized matching policy template corresponds to a matching policy template with smallest size in a set of matching policy templates.

In a variation on this embodiment, when the multiple groups of policy fields include a programmable component group, the system can apply a recursive algorithm to identify one or more matching policy templates, which involves: identifying a first mapping between one or more containers and a respective field in the programmable component group; identifying a second mapping between a set of containers and a respective policy template in the set of templates supported in hardware; determining, based on the first and second mapping, the matching policy template by applying: a finder logic unit; a replacer logic unit; and a shuffler logic unit.

In a variation on this embodiment, the system can apply the finder logic unit which involves: in response to determining that a current policy template includes one or more available containers for one or more policy fields in the programmable component group, assigning the one or more policy fields to the corresponding available one or more containers; in response to determining that a container for a next policy field is already assigned to another field and the current policy template includes an available container, applying the replacer logic unit; in response to determining that the container for the next policy field in the user request is already assigned to another field and the policy template includes no available containers, applying the shuffler logic unit; and in response to determining that the policy fields in the programmable component group are assigned to the set of containers in the current policy template, selecting the current policy template as the matching policy template; and in response to determining that the policy fields in the programmable component group are not assigned to the set of containers in the current policy template, applying the finder logic unit to a next policy template.

In a further variation, the system can apply the replacer logic unit which involves: in response to determining that a first container is already assigned to a first field in the policy template and there exists second container that is available for the first field, locking the first container for a next policy field; and applying the finder logic unit to re-assign the first field to the second container and for assigning the next policy field to the first container; and in response to determining that the policy template include no available containers, but the first policy field is associated with a shareable container assigned to a second policy field, locking the first container for the next policy field; and applying the finder logic unit to re-assign the first policy field to the shareable container and for assigning the next policy field to the first container.

In a further variation, the system can apply the shuffler logic unit which involve shuffling the fields already assigned to the containers; and applying the replacer logic unit when the policy template includes shareable containers.

In a further variation, the multiple groups of policy fields include one or more of: a common component group including a set of common fields based on a traffic type; a context component group including one or more interface identifiers; and programmable component group including one or more variable fields with different sizes.

In a further variation, the hardware resources include ternary content addressable memory; and one or more counters.

In a further variation, the system can receive, at the network device, a user request to add one or more policy entries to an existing policy table. The system can in response to determining that the existing policy table includes sufficient memory, adding the one or more policy entries to the existing policy table. The system can then in response to determining that the existing policy table does not include sufficient memory, reassigning resources to the existing policy table for accommodating the one or more policy entries.

One embodiment described in the present disclosure can provide a network device which includes a processor, a memory, and a circuitry. The circuitry can include: a set of hardware resources for storing a set of policy tables, a set of policy templates, and one or more counters; a communication logic unit to receive a user request to create a policy table, the user request including multiple groups of policy fields and specifying an amount of hardware resource for the policy table; a resource allocation logic unit to: in response to determining that an amount of unallocated hardware resource is less than the amount of hardware resource specified in the user request, free a portion of allocated hardware resources; and allocate the specified amount of hardware resource for the policy table.

The circuitry can further include: an optimized policy template selection unit to identify, based on the user request and a plurality of policy templates supported in hardware, an optimized matching policy template that accommodates the multiple groups of policy fields, wherein a respective policy template is associated with a different set of policy fields; a configure logic unit to configure, based on the optimized matching policy template, one or more hardware template registers; and a policy table create logic unit to create, based on the configured one or more hardware template registers, the policy table.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, ASIC chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A computer-implemented method comprising:
   receiving, at a network device, a user request to create a policy table, the user request including multiple groups of policy fields and specifying an amount of hardware resource for the policy table;
   in response to determining that an amount of unallocated hardware resource is less than the amount of hardware resource specified in the user request, freeing a portion of allocated hardware resources;
   allocating the specified amount of hardware resource for the policy table;
   identifying, based on the user request and a plurality of policy templates supported in hardware, an optimized matching policy template that accommodates the multiple groups of policy fields, wherein a respective policy template is associated with a different set of policy fields, when the multiple groups of policy fields include a programmable component group: applying a recursive key selection algorithm to identify a matching policy template, which involves:
      identifying a first mapping between one or more containers and a respective field in the programmable component group;
      identifying a second mapping between a set of containers and a respective policy template in the set of templates supported in hardware;
      determining, based on the first and second mapping, the matching policy template by applying:
         a finder logic unit;
         a replacer logic unit; and
         a shuffler logic unit;
   configuring, based on the optimized matching policy template, one or more hardware template registers; and
   creating, based on the configured one or more hardware template registers, the policy table.

2. The computer-implemented method of claim 1, further comprising:
   identifying one or more matching policy templates for a respective policy field group.

3. The computer-implemented method of claim 1, wherein the optimized matching policy template corresponds to a matching policy template with smallest size in a set of matching policy templates.

4. The computer-implemented method of claim 1, wherein applying the finder logic unit comprises:
   in response to determining that a current policy template includes one or more available containers for one or more policy fields in the programmable component group, assigning the one or more policy fields to the corresponding available one or more containers;
   in response to determining that a container for a next policy field is already assigned to another field and the current policy template includes an available container, applying the replacer logic unit;
   in response to determining that the container for the next policy field in the user request is already assigned to another field and the policy template includes no available containers, applying the shuffler logic unit;
   in response to determining that the policy fields in the programmable component group are assigned to the set of containers in the current policy template, selecting the current policy template as the matching policy template; and
   in response to determining that the policy fields in the programmable component group are not assigned to the set of containers in the current policy template, applying the finder logic unit to a next policy template.

5. The computer-implemented method of claim 4, wherein applying the replacer logic unit comprises:
   in response to determining that a first container is already assigned to a first field in the policy template and there exists second container that is available for the first field, locking the first container for a next policy field and applying the finder logic unit to re-assign the first field to the second container and for assigning the next policy field to the first container; and
   in response to determining that the policy template include no available containers, but the first policy field is associated with a shareable container assigned to a second policy field, locking the first container for the next policy field and applying the finder logic unit to re-assign the first policy field to the shareable container and for assigning the next policy field to the first container.

6. The computer-implemented method of claim 4, wherein applying the shuffler logic unit comprises:
   shuffling the fields already assigned to the containers; and
   applying the replacer logic unit when the policy template includes shareable containers.

7. The computer-implemented method of claim 1, wherein the multiple groups of policy fields include one or more of:
   a common component group including a set of common fields based on a traffic type;
   a context component group including one or more interface identifiers; and
   programmable component group including one or more variable fields with different sizes.

8. The computer-implemented method of claim 1, wherein the hardware resources include:
   ternary content addressable memory; and
   one or more counters.

9. The computer-implemented method of claim 1, further comprising:
   receiving, at the network device, a user request to add one or more policy entries to an existing policy table;
   in response to determining that the existing policy table includes sufficient memory, adding the one or more policy entries to the existing policy table; and
   in response to determining that the existing policy table does not include sufficient memory, reassigning resources to the existing policy table for accommodating the one or more policy entries.

10. A network device comprising:
    a processor;
    memory;
    a circuitry comprising:
       a set of hardware resources for storing a set of policy tables, a set of policy templates, and one or more counters;
       a communication logic unit to receive a user request to create a policy table, the user request including multiple groups of policy fields and specifying an amount of hardware resource for the policy table;
       a resource allocation logic unit to:
          in response to determining that an amount of unallocated hardware resource is less than the amount of hardware resource specified in the user request, free a portion of allocated hardware resources; and allocate the specified amount of hardware resource for the policy table;

an optimized policy template selection unit to identify, based on the user request and a plurality of policy templates supported in hardware, an optimized matching policy template that accommodates the multiple groups of policy fields, wherein a respective policy template is associated with a different set of policy fields;

a configure logic unit to configure, based on the optimized matching policy template, one or more hardware template registers; and a policy table create logic unit to create, based on the configured one or more hardware template registers, the policy table;

a recursive key selection logic unit to:

apply a recursive key selection algorithm to identify a matching policy template when the multiple groups of policy fields include a programmable component group;

wherein while applying the recursive key selection algorithm, the recursive key selection logic unit is further to:

identify a first mapping between one or more containers and a respective field in the programmable component group;

identify a second mapping between a set of containers and a respective policy template in the set of templates supported in hardware;

determine, based on the first and second mapping, the matching policy template by applying:

a finder logic unit;

a replacer logic unit; and a shuffler logic unit.

11. The network device of claim 10, wherein the optimized policy template selection logic unit is further to identify one or more matching policy templates for a respective policy field group.

12. The network device of claim 10, wherein the optimized matching policy template corresponds to a matching policy template with smallest size in a set of matching policy templates.

13. The network device of claim 10, wherein the finder logic unit is to:

in response to determining that a current policy template includes one or more available containers for one or more policy fields in the programmable component group, assign the one or more policy fields to the corresponding available one or more containers;

in response to determining that a container for a next policy field is already assigned to another field and the current policy template includes an available container, apply the replacer logic unit;

in response to determining that the container for the next policy field in the user request is already assigned to another field and the policy template includes no available containers, apply the shuffler logic unit;

in response to determining that the policy fields in the programmable component group are assigned to the set of containers in the current policy template, select the current policy template as the matching policy template; and in response to determining that the policy fields in the programmable component group are not assigned to the set of containers in the current policy template, apply the finder logic unit to a next policy template.

14. The network device of claim 10, wherein the replacer logic unit is to:

in response to determining that a first container is already assigned to a first field in the policy template and there exists second container that is available for the first field, lock the first container for a next policy field and apply the finder logic unit to re-assign the first field to the second container and for assigning the next policy field to the first container; and in response to determining that the policy template include no available containers, but the first policy field is associated with a shareable container assigned to a second policy field, lock the first container for the next policy field and apply the finder logic unit to re-assign the first policy field to the shareable container and for assigning the next policy field to the first container.

15. The network device of claim 10, wherein the shuffler logic unit is to:

shuffle the fields already assigned to the containers; and apply the replacer logic unit when the policy template includes shareable containers.

16. The network device of claim 10, wherein the multiple groups of policy fields include one or more of:

a common component group including a set of common fields based on a traffic type;

a context component group including one or more interface identifiers; and programmable component group including one or more variable fields with different sizes.

17. The network device of claim 10, wherein the hardware resources include:

ternary content addressable memory; and one or more counters.

18. The network device of claim 10, wherein the communication logic unit is further to receive a user request to add one or more policy entries to an existing policy table; and wherein the resource allocation logic unit is further to:

in response to determining that the existing policy table includes sufficient memory, add the one or more policy entries to the existing policy table; and in response to determining that the existing policy table does not include sufficient memory, reassign resources to the existing policy table for accommodating the one or more policy entries.

* * * * *